(12) United States Patent
Stahr

(10) Patent No.: US 7,555,114 B1
(45) Date of Patent: Jun. 30, 2009

(54) SYSTEM AND METHOD FOR ANALYZING OUTBOUND CALLING CAMPAIGNS

(75) Inventor: Thomas R. Stahr, Omaha, NE (US)

(73) Assignee: Prairie Systems, Inc., Omaha, NE (US)

( * ) Notice: Subject to any disclaimer, the term of this patent is extended or adjusted under 35 U.S.C. 154(b) by 621 days.

(21) Appl. No.: 10/943,056

(22) Filed: Sep. 16, 2004

(51) Int. Cl.
*H04M 3/00* (2006.01)
*H04M 5/00* (2006.01)

(52) U.S. Cl. .................... 379/265.01; 379/265.02; 379/265.06; 379/266.07; 379/309

(58) Field of Classification Search ............ 379/265.01, 379/265.02, 265.06, 266.07, 309
See application file for complete search history.

(56) References Cited

U.S. PATENT DOCUMENTS

| | | | |
|---|---|---|---|
| 4,941,168 A * | 7/1990 | Kelly, Jr. ................ | 379/69 |
| 5,465,286 A * | 11/1995 | Clare et al. ............. | 379/32.04 |
| 6,208,970 B1 | 3/2001 | Ramanan | |
| 6,233,319 B1 * | 5/2001 | Cox et al. ............... | 379/88.22 |
| 6,324,262 B1 * | 11/2001 | Tuttle ...................... | 379/69 |
| 6,751,310 B1 | 6/2004 | Crossley | |
| 2003/0147522 A1 * | 8/2003 | Elazar .................... | 379/265.06 |

* cited by examiner

*Primary Examiner*—Quynh H Nguyen
(74) *Attorney, Agent, or Firm*—Holland & Hart LLP

(57) ABSTRACT

A system and method for analyzing calling campaigns uses human call monitors that listen to calls initiated by an automated calling system. In one embodiment, the call monitors listen to calls as they are initiated by the system. In another embodiment, the calls are recorded for subsequent review by the call monitors. The monitors review the calls according to predefined criteria for assessing the accuracy of the automated calling system. Data is collected from the calling system and the monitors for the calculation of actual calling system success rates.

11 Claims, 4 Drawing Sheets

SYSTEM AND METHOD FOR ANALYZING OUTBOUND CALLING CAMPAIGNS

BACKGROUND OF THE INVENTION

1. Field of the Invention

The present invention relates to automated call establishment systems, and more particularly to a system and method for analyzing outbound calling campaigns.

2. Description of the Prior Art

Automated call establishment systems are used by various industries to deliver prerecorded messages to business contacts for a wide range of reasons. These systems are commonly found in the credit and banking industries, just to name a few, and can be used to notify a customer of a problem with their account, such as a suspected incidence of fraud or a delinquent payment. These systems typically dial pre-identified telephone numbers automatically and transmit the prerecorded message to the customer or contact once the call has been answered. The prerecorded message can vary depending on whether the call is answered by a live individual or a machine. In some cases, for example, when an answering machine is detected, a message may not be left.

Different progress analysis systems use different methods to determine if a call has been answered by a live contact or by an automated answering machine. These systems typically rely on audio signals received from a far end subscriber. However, such call progress tones are sometimes unavailable or may be imperceptible. Moreover, this type of system is usually unable to distinguish a live human voice from a prerecorded voice. Other known systems may rely on the length of the greeting received after the line goes off the hook. Similarly, such systems may calculate the length of a silent pause detected after the receipt of an initial greeting. However, such systems are frequently prone to error where, for example, background noise on the contact's end of the line prevents the detection of a silent pause or an accurate calculation of its duration. Other systems that apply speech recognition tools to identify certain words or word patterns are also susceptible to common errors.

Vendors who offer automated call establishment services commonly claim a widely varying success rate for detecting a live answer versus a prerecorded voice. Regardless of whether the vendor claims a high or low success rate, there is usually no factual support for the vendors' claims. However, in most outbound calling campaigns, knowledge relating to the success rate of an automated call establishment system can be valuable. Where such systems present messages that are not received favorably, the messages can be changed. Likewise, if the system receives a hang-up prior to the delivery of its substantive message, calling times and messages can be altered accordingly until more favorable responses are received. Knowledge of a system's success rate may also determine the likelihood of the vendor being retained for future campaigns. Accordingly, where a vendor can substantiate a claim for a high success rate in delivering automated messages, a significant advantage can be attained in the industry.

Accordingly, what is needed is an improved system and method for analyzing outbound calling campaigns that monitors the campaigns according to predetermined criteria in order to verify the success rate of the automated call establishment system.

SUMMARY OF THE INVENTION

A system and method of analyzing an outbound calling campaign is provided with an automated system that initiates calls to a plurality of contacts. The automated system detects and identifies signals transmitted from the contacts and provides specific responses to particular signals transmitted from the contacts. One or more human call monitors are provided to listen to at least a portion of the calls initiated by the system. The call monitors are provided with a predetermined set of call criteria to monitor while listening to the calls. The call monitor records data relating to the manner in which the calls fit the predetermined criteria. The system accumulates the data generated by the call monitors and provides analysis reports of the call campaign.

In one preferred embodiment, the call monitors listen to live calls generated by the automated system. In another embodiment, the call monitors access prerecorded calls that were initiated by the automated system and stored to a database. The database may be accessed remotely over a network, such as the Internet in one embodiment. The database may also be transmitted in whole or in part to a call monitoring location. Regardless of whether or not the calls are monitored in a live or recorded environment, the criteria used for monitoring the calls may be adapted to fit a nearly endless array of industries and calling campaigns.

It is therefore a principal object of the present invention to provide a system and method for analyzing calling campaigns to verify the accuracy of the automated calling system used.

A further object of the present invention is to provide a system and method of analyzing a calling campaign that uses human call monitors that listen to at least a percentage of the calls for determining the accuracy of the automated calling system being used.

Yet another object of the present invention is to provide a system and method of analyzing calling campaigns that uses human call monitors to monitor live calls initiated by an automated calling system.

Still another object of the present invention is to provide a system and method of analyzing calling campaigns that uses human call monitors to listen to prerecorded calls initiated by an automated calling system.

A further object of the present invention is to provide a system and method of analyzing a calling campaign by an automated calling system using a wide range of different call criteria to monitor the calls to create a versatile system for a wide range of applications in different industries.

Still another object of the present invention is to provide a system and method of analyzing calling campaigns by automated calling systems that generates reports based on data recorded by human call monitors regarding the accuracy of the automated calling system.

Yet another object of the present invention is to provide a system and method for analyzing calling campaigns that is implemented remotely through the use of human call monitors.

A further object of the present invention is to provide a system and method of analyzing calling campaigns that is relatively simple to implement.

These and other objects will be apparent to those skilled in the art.

DESCRIPTION OF THE PREFERRED EMBODIMENT

In the following detailed description of exemplary embodiments, reference is made to accompanying FIGS. 1-5, which form a part hereof and show by way of illustration exemplary embodiments of the present invention. These embodiments are disclosed in sufficient detail to enable those skilled in the art to practice the invention. It is to be understood that other embodiments may be utilized, however, and other changes may be made, without departing from the spirit or scope of the present invention. The following detailed description is, therefore, not to be taken in a limiting sense, and the scope of the present invention is defined only by the appended claims.

Figure 1:
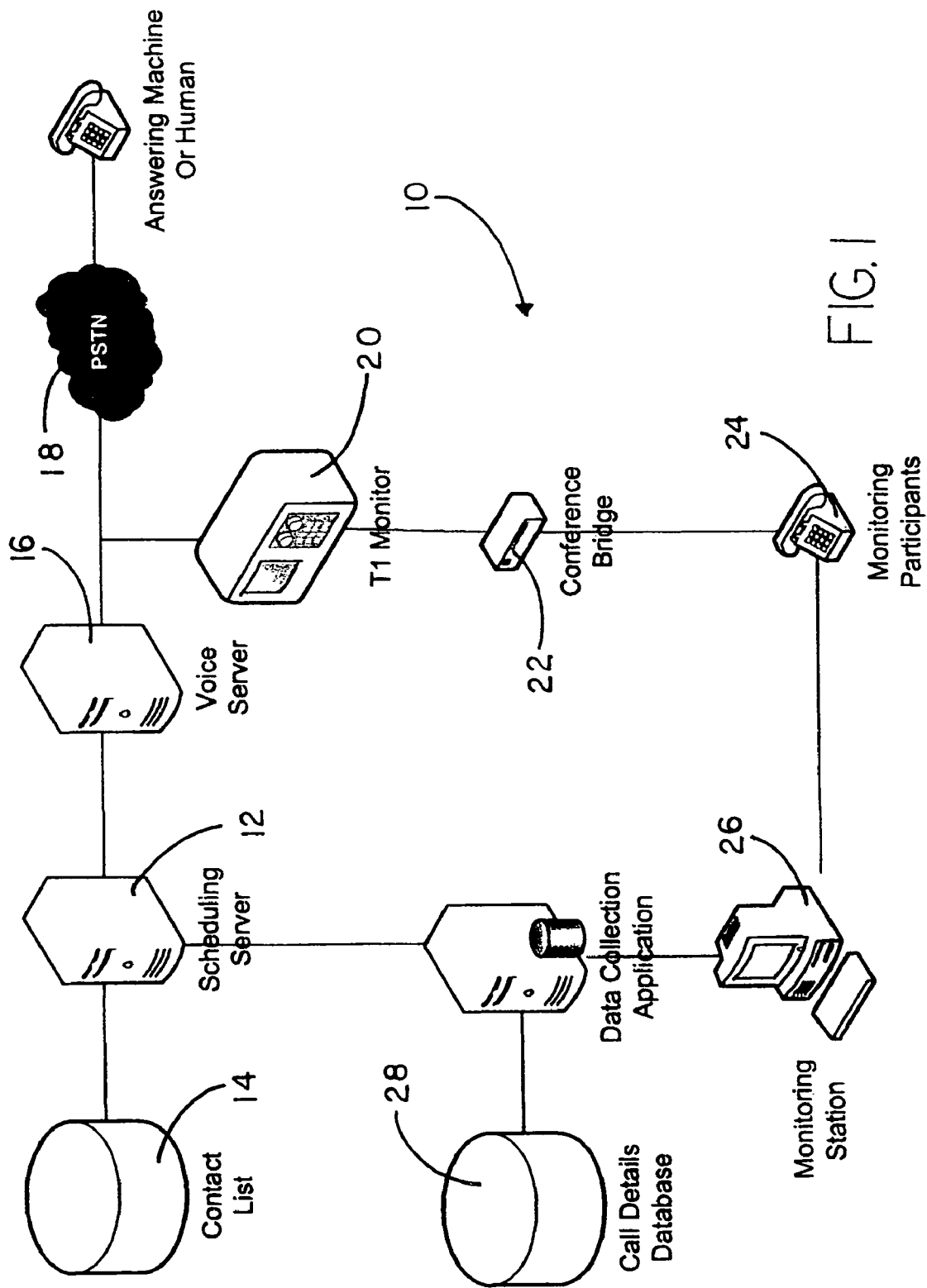
FIG. 1 depicts a general system overview of one embodiment of the present invention as the same could be organized to analyze live calls generated during automated call campaigns.

FIG. 1 depicts a system level overview of one embodiment of the system and method for analyzing live calls from an outbound calling campaign of the present invention. The system 10 is generally comprised of an automated call establishment system, having a scheduling server 12 operatively coupled to a contact list database 14 and a voice server 16. The contact list database 14 contains a plurality of telephone numbers for the customers or "contacts" to be contacted by the system 10. The voice server 16 will be provided with a means (such as a modem, network card, or other similar interfacing device) for accessing a network, including, but not limited to, a publicly switched telephone network (PSTN) 18 from which the contacts may be contacted. It is contemplated that the connection with the PSTN 18 could be made via land line or wireless connections.

In a preferred embodiment, a T1 monitor 20 (or equivalent system) will be operatively coupled with the communications line between the voice server 16 and the PSTN 18. In one embodiment, the T1 monitor 20 may be coupled with a conference bridge 22 and a communications device 24, such as a telephone, to permit a plurality of human call monitors to listen to calls as they are initiated by the system 10. A monitoring station 26 is provided for use by a call monitor while listening to the calls. It is contemplated that an operative connection can be established between the monitoring station 26 and the communications device 24, the conference bridge 22 and/or the T1 monitor 20 in various combinations, permitting the call monitor to listen to the calls. Moreover, the conference bridge 22 may not be necessary, where a single call monitor listens to the calls. The monitoring station 26 is preferably provided with a data collection application for receiving and recording call data to a call details database 28. While a single monitoring station 26 is depicted, it is contemplated that a nearly limitless number of stations could be provided for monitoring calls, depending on the size of the call campaign. The monitoring station 26 should be operatively coupled with the scheduling server 12 to provide the call monitor with access to call campaign information.

In use, the monitor initiates the process at its monitoring station 26. In one preferred embodiment, a job summary screen 30 is presented to the monitor and displays available calling campaigns to monitor. Where the desired call campaign in not identified, the monitor may add the campaign to the list or search the available database. In the present example, the monitor selects the "Marketing Test" campaign from the job summary screen 30, depicted in FIG. 3. The monitor may then be presented with a screen, such as the detail list screen 32 depicted in FIG. 4, which identifies the calls placed by the system and specific information from those calls that might be relevant to the campaign being monitored. The monitor simply selects the "add" icon, which directs the scheduling server 12 to select the next telephone number from the contact list database 14 to be called and may initiate the telephone call through the voice server 16 over the PSTN 18.

Figure 5:
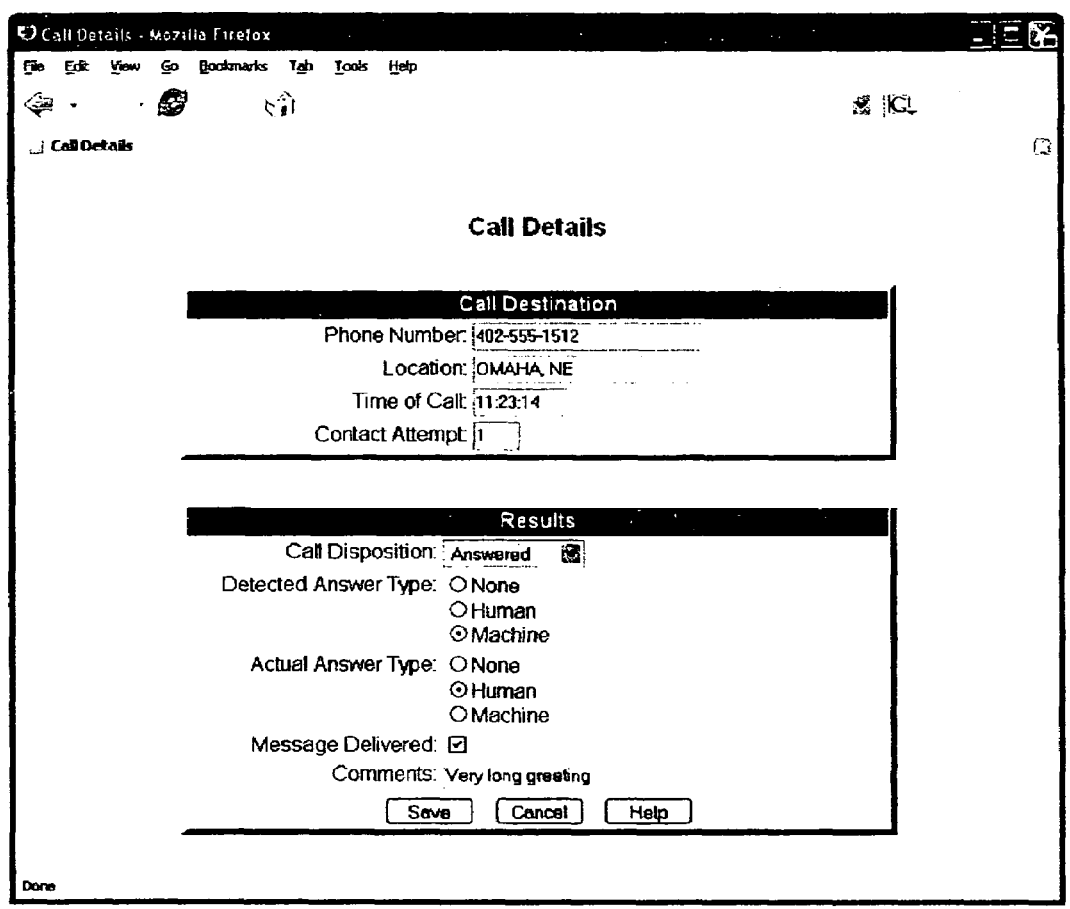
FIG. 5 depicts one possible embodiment of a call details screen that could be used by a call monitor while listening to calls from an automated call campaign.

The monitor is then preferably provided with a call details screen 34, as depicted in FIG. 5. The call details screen 34 may provide information such as the telephone number, the location of the contact being called, the time of the call and which contact attempt is currently being initiated. The call details screen 34 should also provide the monitor with the ability to report whether or not the system 10 has successfully achieved certain predetermined criteria during the telephone call. For example, the call details screen 34 depicted in FIG. 5 shows that the subject telephone call is being monitored to see whether or not the call is answered; if the call is answered by a human or an answering machine; and whether or not the message was successfully delivered to the contact by the system 10. The monitor is preferably provided with the opportunity to identify whether or not the call was answered by the contact, how the system 10 perceived the manner in which the call was answered (by a human or by a machine), the actual manner in which the call was received, whether or not the message was delivered and provide any relevant comments relating to the call and its results. When the call is complete, the monitor simply saves the results and may proceed with the next call. Clearly such a method of monitoring automated calling systems provide a dramatic method of marketing the system to potential customers. Such a system can be monitored live without the knowledge of whether or not the system will accurately conduct the telephone call to the contact. Accordingly, the system is tested live as well as its monitoring system, lending a substantial amount of validity to the presentation being made to the customer.

Figure 2:
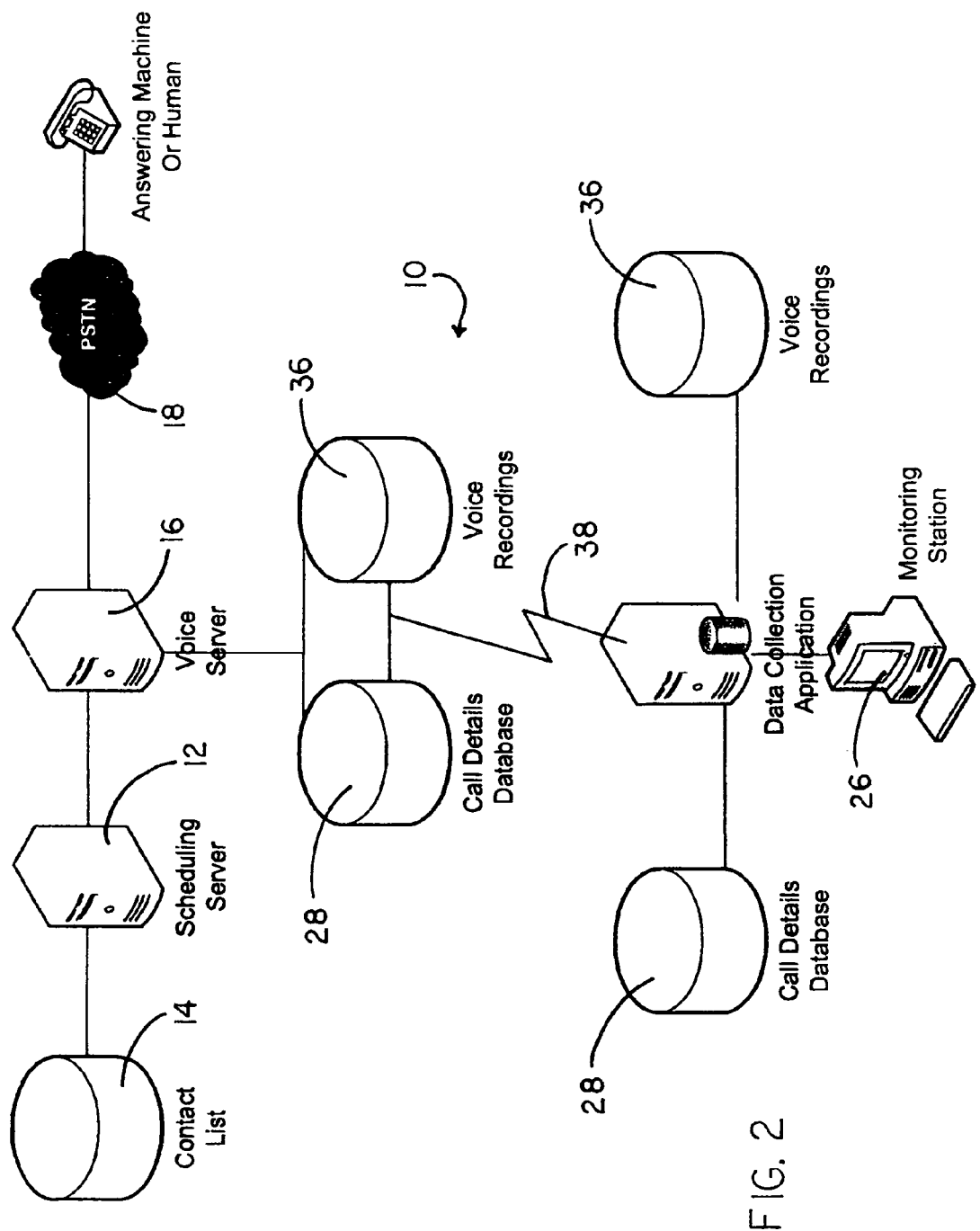
FIG. 2 depicts a general system overview of one embodiment of the present invention as the same could be organized to analyze recorded calls generated during automated call campaigns.

FIG. 2 depicts a system level overview of another embodiment of the system and method for analyzing recorded calls from an outbound calling campaign of the present invention. In this embodiment, the system 10 is generally comprised of an automated call establishment system having a scheduling server 12 operatively coupled to a contact list database 14 and a voice server 16. As with the previously described embodiment, the contact list database 14 will be provided with the telephone numbers of the customers or contacts to be contacted by the system 10. The voice server 16 is provided with a means for accessing a network, such as the PSTN 18, from which the contacts may be reached. A call details database 28 is operatively coupled with the system for receiving details relating to the outbound calls. The system 10 is also provided with a voice recordings database 36 that records each of the outbound telephone calls. In one preferred embodiment, a monitoring station 26 may be operatively coupled with the system 10 to access the call details database and the voice recordings database so that the monitor may selectively listen to individual telephone calls and record the monitor's observations. It is contemplated however that the monitoring station 26 may be remotely coupled with the system 10 over a network 38 such as the Internet or a closed-system network. In still another embodiment, the monitoring station 26 may be positioned remotely from the system 10 and the voice recordings and details database may be transmitted to the monitor over a network connection or through the delivery of the data using any known type of data storage device.

In use, the telephone calls from the system 10 to the individual contacts have already taken place and have been recorded to the voice recordings database 36. After the monitor selects the calling campaign from the job summary list, the calls to be monitored may simply be selected from the detail list screen. Since the system has already completed the calls to be monitored, much of the information regarding the telephone call and the performance of the system is already known. When the monitor is presented with the call detail screen, such as that depicted in FIG. 5, the information relating to the telephone call and the disposition of the call by the system will already be completed. The monitor need only listen to the call and enter data relating to the degree of success achieved by the system in reaching the contact and successfully delivering the message. Accordingly, a greater degree of system flexibility is provided to the extent that the calls have been completed and are merely awaiting evaluation.

Figure 3:
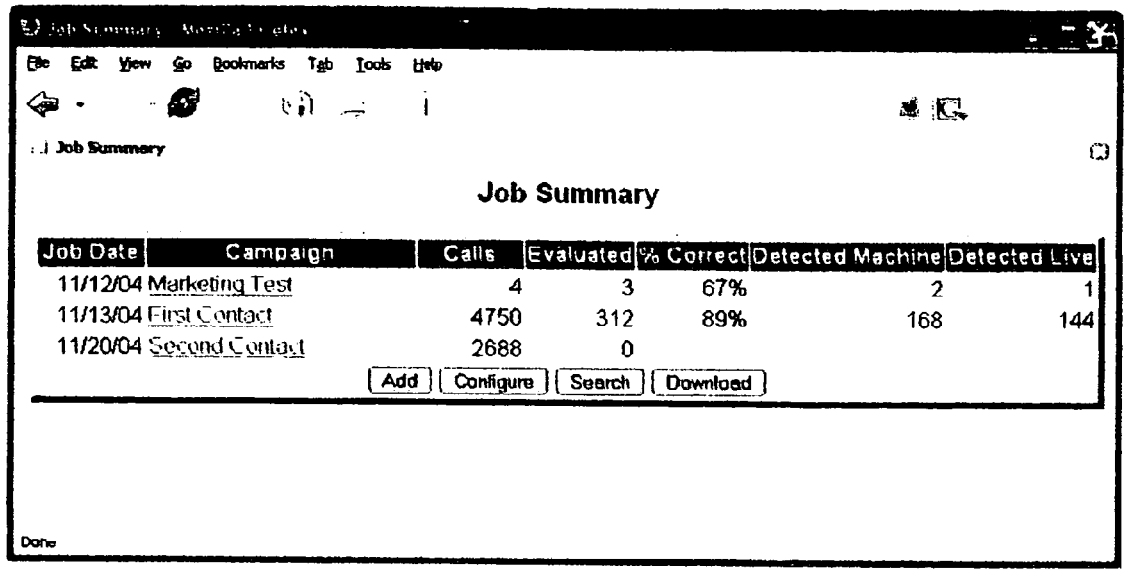
FIG. 3 depicts one possible embodiment of a job summary list screen from which call monitors could select an automated call campaign to monitor.
Figure 4:
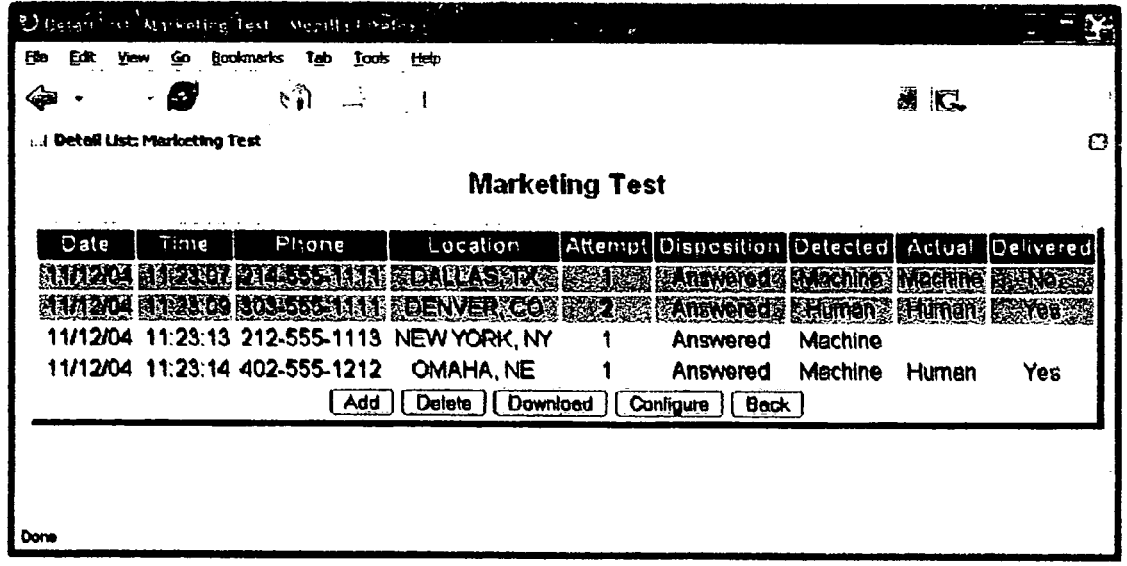
FIG. 4 depicts one possible embodiment of a detail list screen that could be used to list prerecorded calls for a particular selected call campaign.

It is contemplated that the system 10 will be provided with software for automatically compiling the data generated by the system 10 as well as the data generated by the monitors. At any stage during or after the completion of a calling campaign, the system can be properly evaluated by looking at the total number of outbound calls, the number of those calls that were evaluated, and the overall system accuracy, as perceived by the monitors. Additional information can be reported depending upon the criteria being monitored. For example, as depicted in FIG. 3, the system can tabulate the number of calls that were answered live as well as the number of calls that were answered by a machine. Other criteria, depending upon the calling campaign and the type of campaign study being undertaken can be tracked. Some examples of different criteria include the number of hang-ups received, when the hang-ups occurred, etc.

In the drawings and in the specification, there have been set forth preferred embodiments of the invention; and although specific items are employed, these are used in a generic and descriptive sense only and not for purposes of limitation. Changes in the form and proportion of parts, as well as substitution of equivalents, are contemplated as circumstances may suggest or render expedient without departing from the spirit or scope of the invention as further defined in the following claims.

Thus it can be seen that the invention accomplishes at least all of its stated objectives.

I claim:

1. A method of analyzing an outbound calling campaign, comprising the steps of:

providing an outbound campaign having an automated system, including at least a computer device operatively coupled with a monitoring station and a communications network, that initiates calls to a plurality of contacts over the communications network, detects and identifies signals transmitted from said contacts and provides specific responses to particular signals transmitted from said contacts; said automated system being programmed to identify live responses and prerecorded messages transmitted from said contacts and transmit different prerecorded messages to said contacts based on the identification of a live response or a prerecorded message from said contact; said automated system being programmed to provide said contact a set of options from which the contact may make a selection by providing an audible responsive transmission to said automated system; said automated system being further programmed to identify audible responses transmitted by said contact;

providing at least one human call monitor who uses the monitoring station to listen to the signals transmitted from said contacts and the responses to said particular signals transmitted from said contacts for at least a portion of said calls; said human call monitor listening to said calls contemporaneously with said calls being initiated by said automated system;

providing said at least one human call monitor with a predetermined set of call criteria to monitor while listening to said calls; wherein said call criteria comprising a successful identification by said automated system of a live response or a prerecorded message from said contact; and an identification of hang-ups by said contacts during said calls and at which time during said calls said hang-ups occur; and recording data generated by the monitoring of said call criteria by said human call monitor; and generating an analysis report of said call campaign using said data.

2. The method of claim 1 wherein said human call monitor may direct said automated system when to initiate said calls to said contacts.

3. The method of claim 1 wherein said call criteria is comprised of accurate identifications of audible contact responses by said automated system.

4. The method of claim 1 wherein said human call monitor listens to recordings of said calls initiated by said automated system, rather than contemporaneously with said calls being initiated by said automated system.

5. The method of claim 4 wherein said human call monitor selects calls to listen to from a database list of previously recorded calls initiated by said automated system.

6. The method of claim 4 wherein said call criteria is further comprised of the identification of hang-ups by said contacts during said calls and at which time during said calls said hang-ups occur.

7. The method of claim 4 wherein said automated system is programmed to provide said contact a set of options from which the contact may make a selection by providing an audible responsive transmission to said automated system; said automated system being further programmed to identify audible responses transmitted by said contact.

8. The method of claim 7, wherein said call criteria is comprised of accurate identifications of audible contact responses by said automated system.

9. The method of claim 5 wherein said automated system is comprised of said database and said human call monitor accesses said database using a network.

10. The method of claim 9 wherein said network incorporates the use of the Internet.

11. The method of claim 5 wherein said database is stored remotely from said automated system for access by said human call monitor.

\* \* \* \* \*